April 7, 1925.  1,532,314
H. C. JOHLE
GEAR SHIFT
Filed Sept. 9, 1924 4 Sheets-Sheet 1
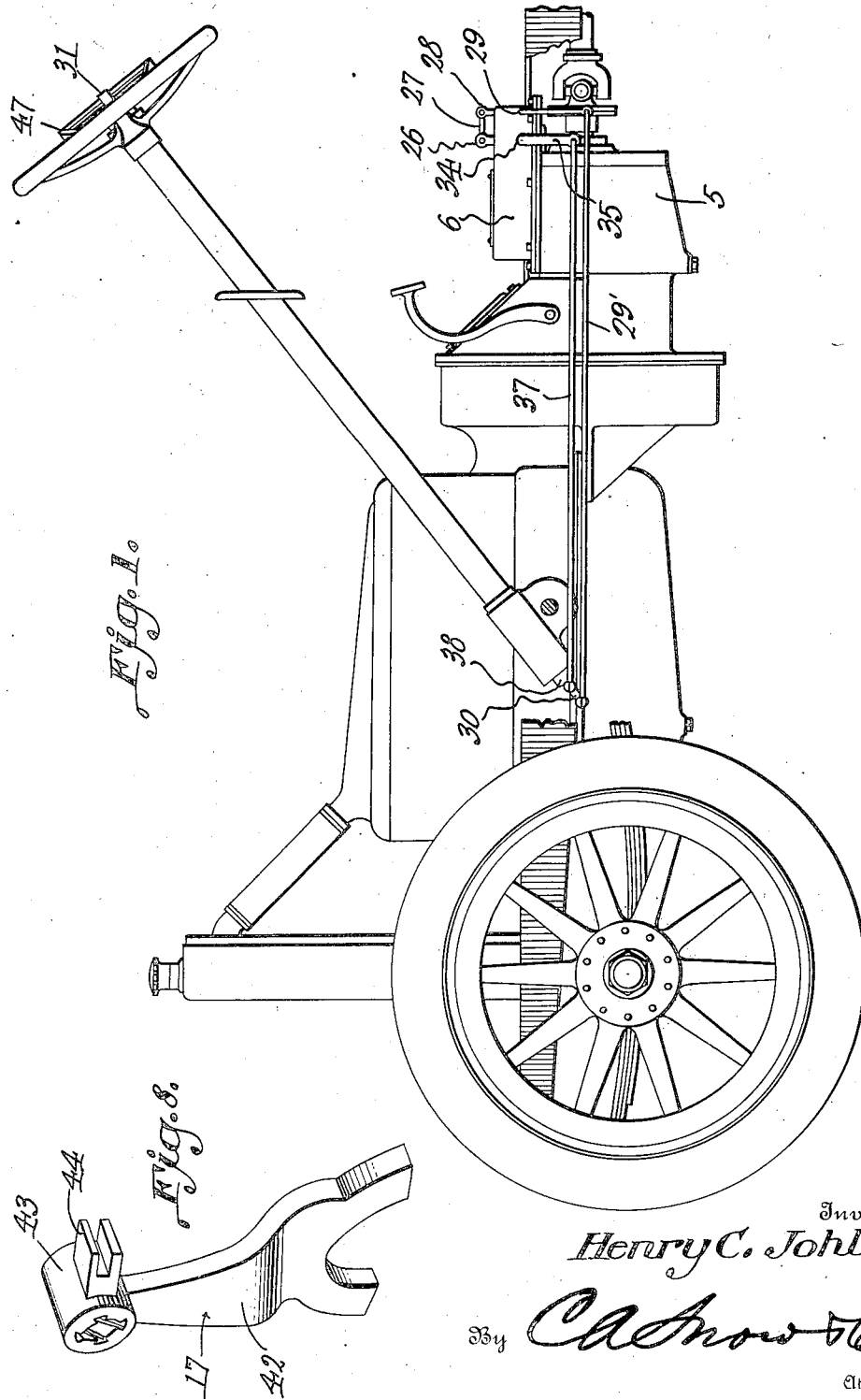
Inventor
Henry C. Johle.
By C. A. Snow & Co
Attorneys April 7, 1925.
H. C. JOHLE
GEAR SHIFT
Filed Sept. 9, 1924
1,532,314
4 Sheets-Sheet 2
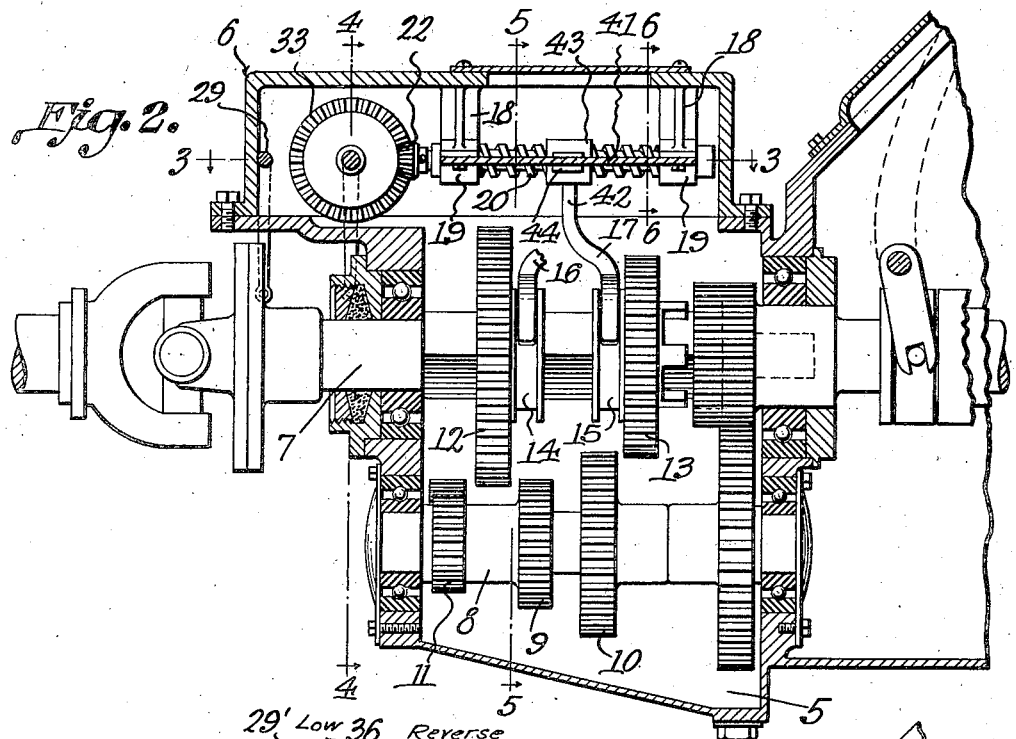
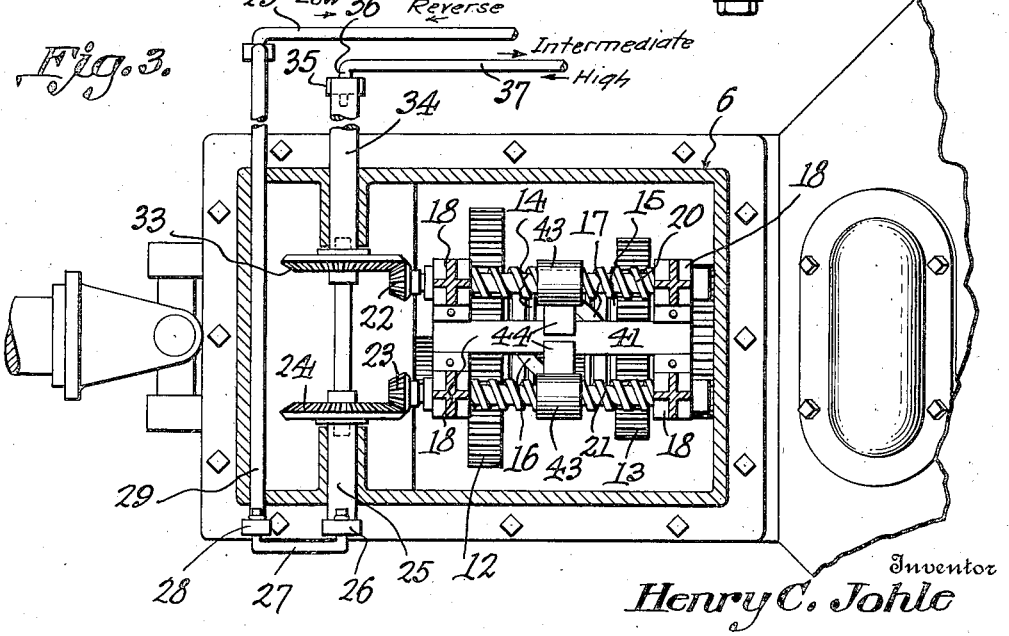
Inventor
Henry C. Johle
By C. A. Snow & Co.
Attorneys

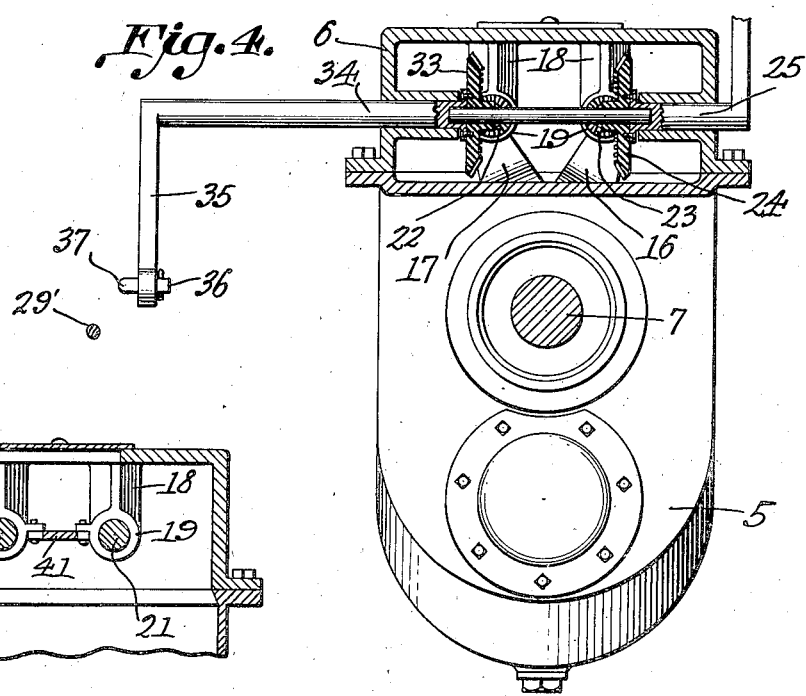
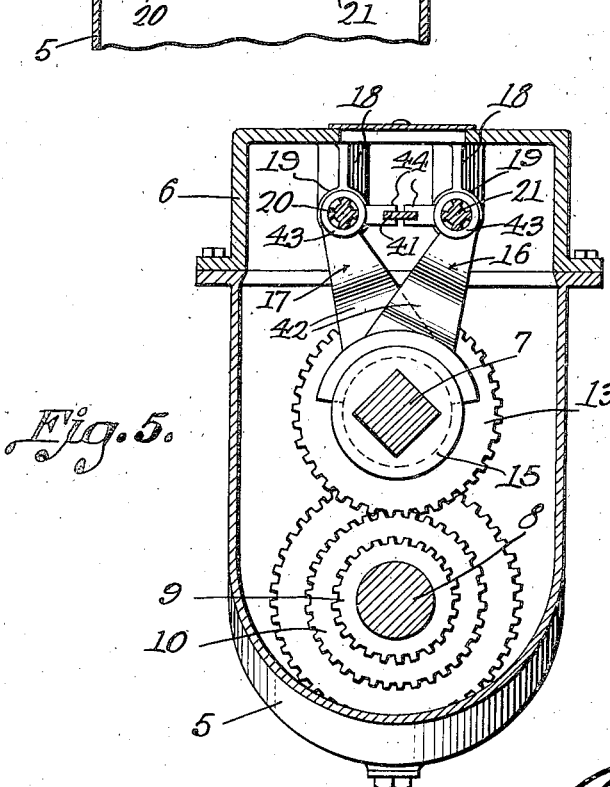
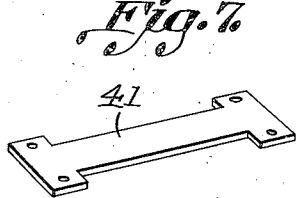

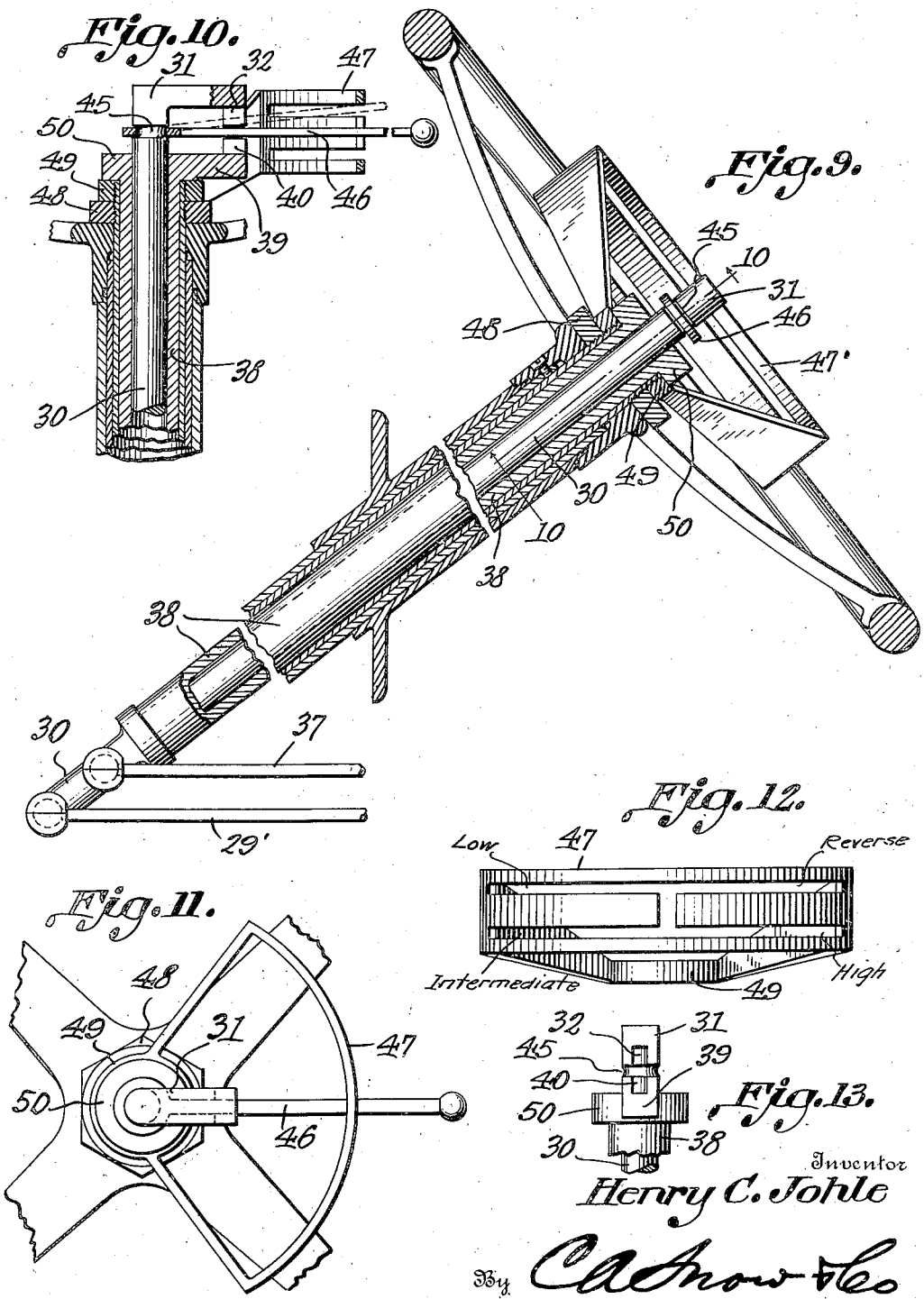

Patented Apr. 7, 1925.

1,532,314

UNITED STATES PATENT OFFICE.

HENRY CARL JOHLE, OF TEMPLE, TEXAS.

GEAR SHIFT.

Application filed September 9, 1924. Serial No. 736,761.

*To all whom it may concern:*

Be it known that I, HENRY C. JOHLE, a citizen of the United States, residing at Temple, in the county of Bell and State of Texas, have invented a new and useful Gear Shift, of which the following is a specification.

This invention relates to a device designed for shifting the gears of the transmission of a motor vehicle, the primary object of the invention being to provide means whereby the operator may shift the gears from a point adjacent to the steering wheel, thereby eliminating the necessity of the operator leaning over or removing his hands from the steering wheel to accomplish the shifting of the gears.

Another important object of the invention is to increase the foot room adjacent to the driver's seat, by eliminating the usual long gear shift lever which usually extends upwardly through the floor board of a motor vehicle.

A further object of the invention is to provide a device of this character which may be readily and easily operated with the minimum amount of exertion on the part of the operator.

A still further object of the invention is the provision of a device of this character which may be readily and easily applied by removing the usual transmission housing cover, and substituting a cover supplied with the operating mechanism embodied in this invention.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view disclosing the application of the gear shifting device constituting the present invention.

Figure 2 is a vertical sectional view through a transmision supplied with a shifting device constructed in accordance with the invention.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is a sectional view taken on line 6—6 of Figure 2.

Figure 7 is a perspective view disclosing the guide plate for the threaded heads of the gear shift forks.

Figure 8 is a perspective view of one of the gear shift forks.

Figure 9 is a longitudinal sectional view through steering column disclosing the operating rods.

Figure 10 is a sectional view taken on line 10—10 of Figure 9.

Figure 11 is a plan view of a steering wheel equipped with the operating device.

Figure 12 is an elevational view of the selecting segment in which the controlling lever operates.

Figure 13 illustrates the head of the operating members in elevation.

Referring to the drawings in detail, the reference character 5 indicates the transmission housing of the usual motor vehicle and the reference character 6 indicates the cover of the transmission, the cover in the present showing being of a novel construction to support the shafts and gearing forming the essence of the present invention.

Operating in the transmision housing 5 is the drive shaft 7 and counter shaft 8, the counter shaft 8 supporting the usual low speed gear 9, intermediate speed gear 10 and reverse speed gear 11, the power of the drive shaft 7 being transmitted to the counter shaft 8 through the pinions 12 and 13, which are of the usual construction, the pinions 12 and 13 being supplied with the usual flanged collars 14 and 15 respectively for the reception of the gear shift forks 16 and 17 respectively.

Formed integral with the cover 6 and depending therefrom are arms 18 that carry bearings 19 at their lower ends, in which bearings operates the worms 20 and 21 respectively. Mounted at the forward ends of the worms 20 and 21 are beveled pinions 22 and 23 respectively, the pinion 23 meshing with the beveled pinion 24 carried at the inner end of the shaft 25, formed with a right angled extremity 26 which is apertured to accommodate one end of the link 27, the opposite end of the link 27 being positioned in a suitable opening formed in the right angled end 28 of the rod 29. As shown, this rod 29 is connected with the rod 30 that extends upwardly through the steering column and carries the extension 31 at its upper end, which extension is formed with a cut out portion 32.

Meshing with the pinion 22 is a beveled pinion 33 which is carried at the inner end of the shaft 34 formed with a right angle extremity 35, which is also provided with an opening to accommodate the right angled end 36 of the controlling rod 37, which controlling rod 37 connects with the sleeve 38 provided with an extension 39 and which is formed with a cut out portion 40 for purposes to be hereinafter more fully described.

Positioned between the arms 18 and secured adjacent to the bearings thereof is a guide plate 41, which guide the gear shift forks 42, the gear shift forks 42 being formed with internally threaded heads 43 that move over the worms 20 and 21. Spaced fingers 44 are provided on each of the heads 43, the fingers 44 extending laterally therefrom to embrace portions of the guiding plate and insure a true horizontal movement of the gear shift forks.

At the upper end of the rod 30 is formed a groove 45 which acts as a seat for the inner end of the controlling lever 46 that is supported on the rod 30 to move independently thereof. A sector 47 is mounted at the upper end of the rod 30 and is secured into position by means of the nut 48 which forces the central portion 49 of the sector into engagement with the head 50. The sector 47 is formed with an H-shaped slot in which the controlling lever 46 moves in selecting the gears.

In the operation of the device, the clutch pedal of the motor vehicle is thrown out to disengage the clutch, whereupon the lever 46, should it be desired to move the gears to bring low gear into play, the controlling lever 46 is moved to the central portion of the H slot of the sector, thereupon it is moved upwardly or towards the operator. With this movement of the lever, the lever tilts to a position as shown in dotted lines in Figure 10 and rests within the notch 32 of the extension 31 to carry the rod 30 with it and cause a slight rotary movement thereof, which movement is imparted to the pinion 34 which rotates pinion 23 imparting rotary movement to the worm 21 in a direction to cause the gear shift fork 16 to move the pinion 12 into engagement with pinion 9.

It follows that in order to move the remaining gears into play, the lever 46 is moved accordingly to engage the proper extensions 31 or 39 according to the selection to be made.

Due to the foregoing construction, it will be obvious that I have provided a transmission operating mechanism of the selective type which may be readily and conveniently operated at a point adjacent to the steering wheel so that the transmission gears may be thrown into operation without the necessity of the operator removing his hands from the steering wheel.

I claim:—

1. A transmission gearing operating device including a pair of worms, supported above the gearing of a transmission, gear shift forks having heads formed with threaded openings adapted to accommodate the worms, said forks having connection with gears of the transmission, and means for rotating the worms to move the forks for moving the gears.

2. A transmission gearing operating device including a pair of worms, means for supporting the worms above the gearing of a transmission, gear shift forks mounted on the worms and contacting with gears of the transmission, and manually controlled means for moving the worms to cause the gear shift forks to move the gears into and out of operation.

3. A transmission gearing operating mechanism comprising a cover adapted to be supported over the gearing of a transmission, bearings depending from the cover, worms mounted in the bearings, gear shift forks having heads, said heads having threaded openings to accommodate the worms, said gear shift forks having connection with gears of the transmission, and means for rotating the worms to move the gear shift forks to move the gears of the transmission.

4. A transmission gearing operating device including a pair of worms supported above the gearing of a transmission, gear shift forks having heads formed with threaded openings positioned on the worms, a guide plate disposed between the worms, spaced fingers formed integral with the heads and adapted to embrace portions of the guide plate to prevent rotary movement of the gear shift forks, said gear shift forks having connection with gears of the transmission, and means for rotating the worms to move the forks.

5. A transmission gearing operating device including a pair of worms supported above the gearing of a transmission, gear shift forks having heads formed with openings to accommodate the worms, said forks having connection with the gears of the transmission, beveled pinions mounted on the worms, beveled pinions meshing with the first mentioned beveled pinions, and manually controlled means for operating the latter beveled pinions to rotate the worms for moving the gears.

In testimony that I claim the foregoing as my own, I have hereto affixed my signature in the presence of two witnesses.

HENRY CARL JOHLE.

Witnesses:
W. F. JOHLE,
D. JOHNSON.